INVENTOR.
SYLVESTER M. MEITINGER
BY
ATTORNEY

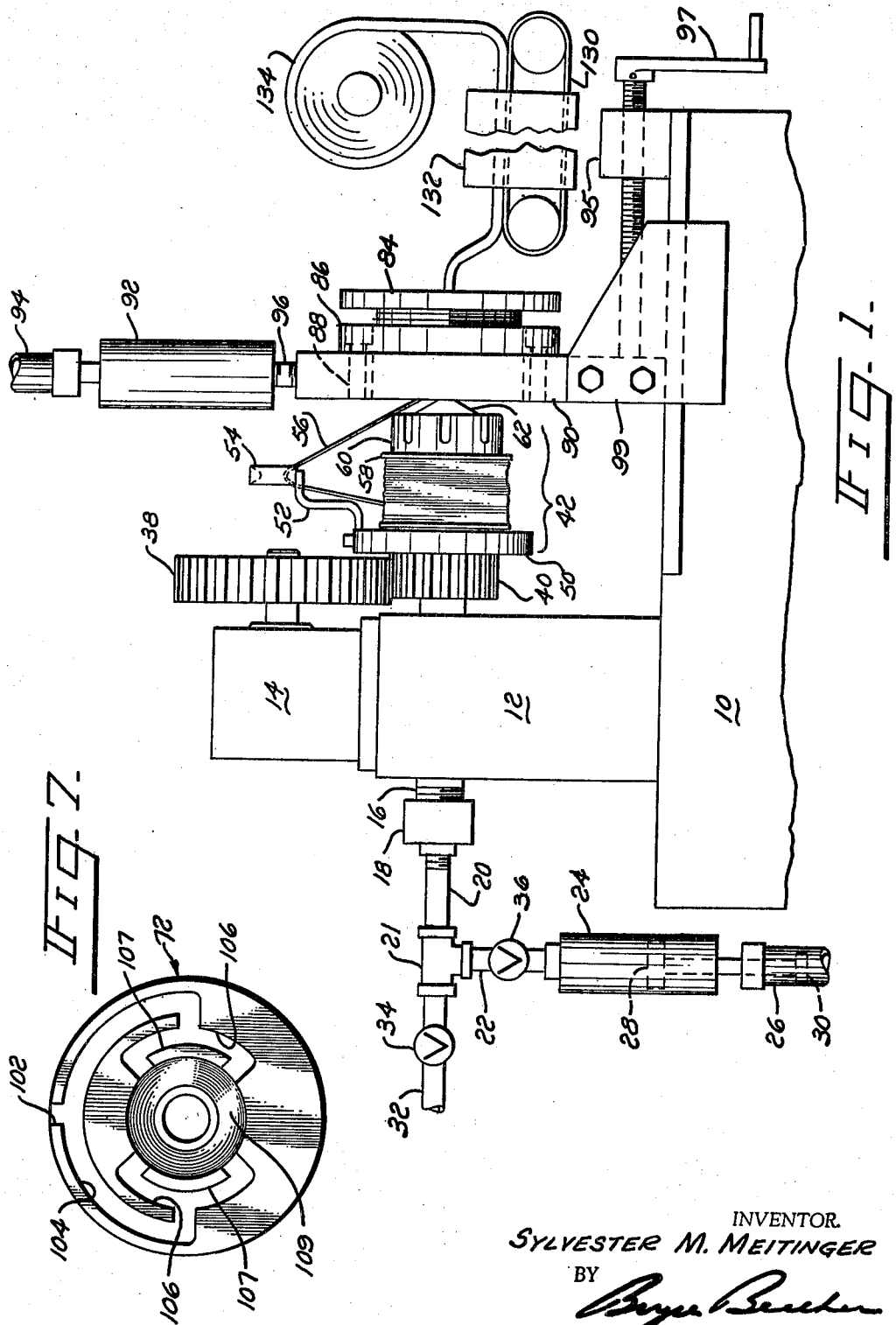

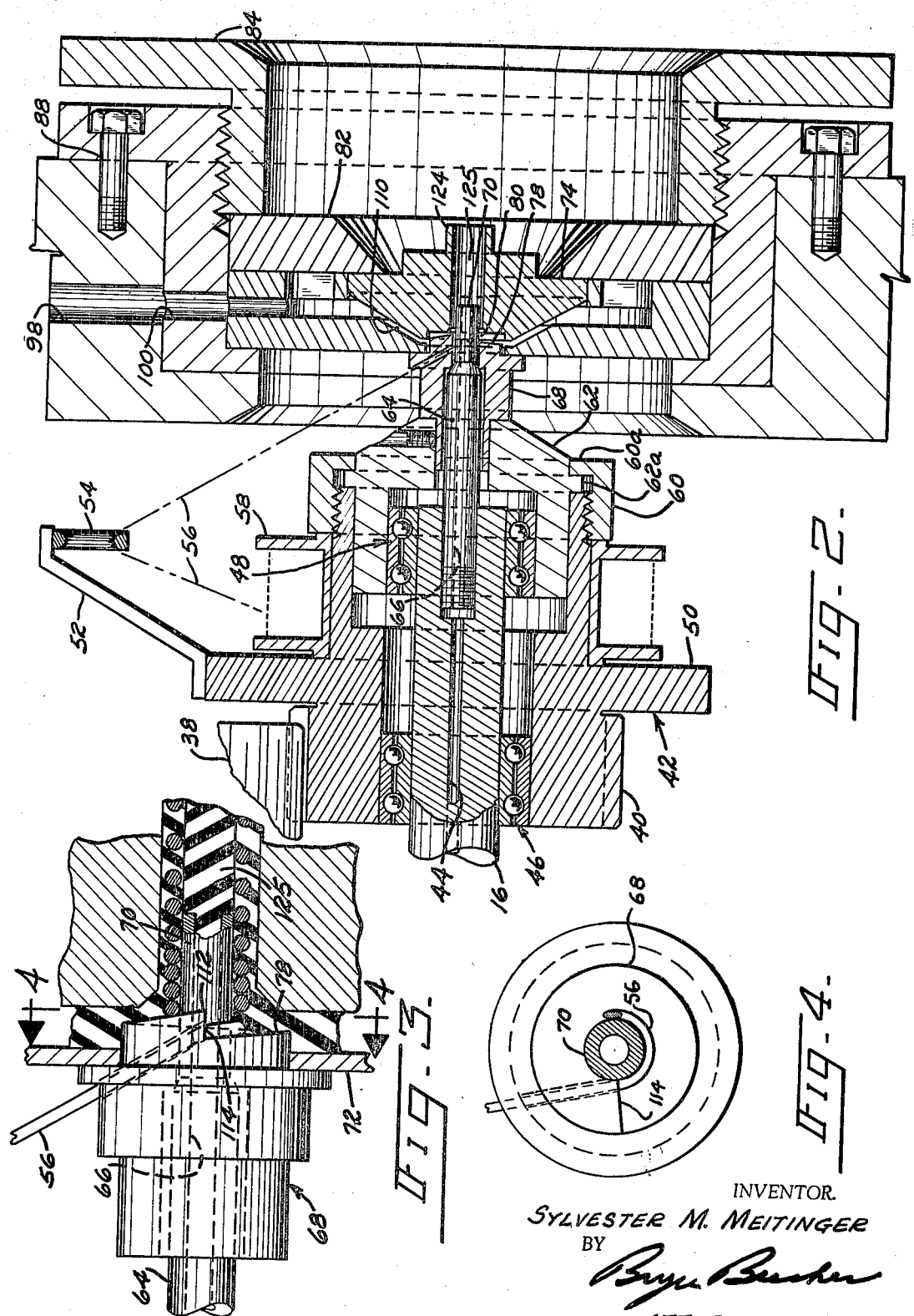

United States Patent Office 3,495,300
Patented Feb. 17, 1970

3,495,300
APPARATUS FOR MANUFACTURE OF INSULATED WIRE PRODUCTS AND THE LIKE
Sylvester Martin Meitinger, Toledo, Ohio, assignor, by mesne assignments, to Stauffer-Wacker Silicone Corporation, a corporation of Delaware
Filed Apr. 13, 1966, Ser. No. 547,704
Int. Cl. B29f 3/10
U.S. Cl. 18—13                                    4 Claims

ABSTRACT OF THE DISCLOSURE

Apparatus is disclosed for coating a strand material with a plastic substance while simultaneously forming the strand material to a helical configuration.

---

This invention relates to the simultaneous forming and coating of strand material and more especially relates to system of apparatus for fabricating insulated wire and cable products such as are employed in the electrical industry. In its most particular aspect, the invention is concerned with the manufacture of products of the indicated character which are adapted to stretch in use.

Products fabricated according to the invention have utility, for example, with respect to electrical hand tools and appliances which are supplied with power from a remote source and which in use must be moved about without substantial restriction.

It is, of course, common as in the instance of the ordinary desk telephone, where the receiver is separate from the remainder of the equipment, to allow for such motion through the provision of a coiled electric cord. Such a cord takes little advantage of the inherent elasticity or stretchability of the rubber insulation which is coextensive with and follows the convolutions of the wire conductor.

A major advantage of the present invention resides in the fact that it does take advantage of such property of the insulating rubber to the end that less of any given rubber material may be used in the insulation or, alternatively, to the end that the insulation may be effected using a more expensive rubber than is normally employed, yet at the same or lower cost. Thus, the invention permits the use of silicone rubber, with the advantage of its superior dielectric properties, in applications where cost factors have heretofore barred or interfered with the use of such material.

A principal object of the present invention is implicit in the foregoing. Another principal object is to provide an apparatus for practicing the process, whereby the coiling of the conductor component of the cable and the insulation thereof is accomplished as a one-step operation. This too lowers cost, making all the more possible use of the more desirable insulating materials.

Figure 5:
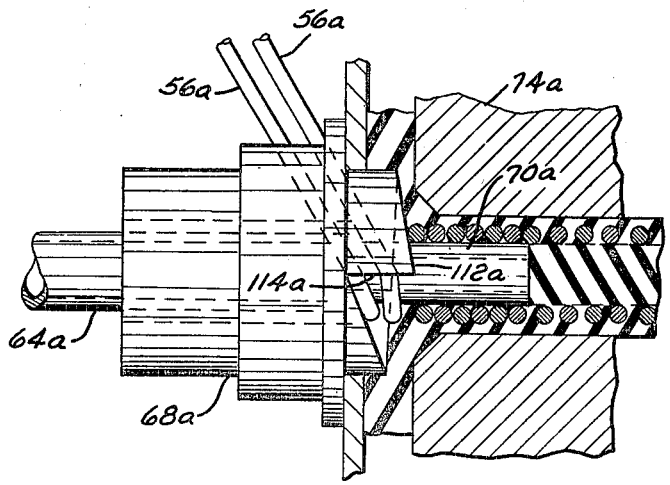
Figure 6:
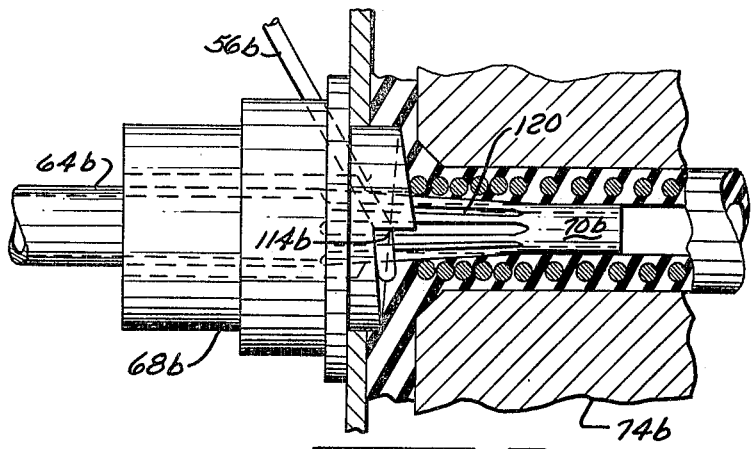

Other objects, advantages, and features of the invention will be apparent from the following description which will proceed with reference to the accompanying drawings wherein:

FIGURE 1 shows in elevation a system of apparatus suited for the practice of the invention, certain auxiliary parts appearing broken away or not to scale;
FIGURE 2 is a vertical section taken on the center line of FIGURE 1;
FIGURE 3 is an enlarged fragmentary view, with parts shown in elevation and in section;
FIGURE 4 is a view on the line 4—4 in FIGURE 3;
FIGURES 5 and 6 are enlarged fragmentary details similar to FIGURE 3 illustrating modified forms; and
FIGURE 7 is a detail of a distributor plate employed in the apparatus.

Generally described, the process herein comprises continuously passing the wire conductor or other strand material, desired to be insulated or covered, into an application zone adapted also for the continuous reception of the rubber or other plastic substance which is applied to the strand material as the same is formed to a predetermined configuration, normally a helical configuration.

Referring now to FIGURE 1 of the drawings, there will be seen a base member 10 mounting a support 12. Reduction gearing 14 fixed to such support is powered by an electric motor, not shown.

Also fixed to the support 12 is a shaft 16 which at its end leftward of the support 12 is threaded to accommodate a fixture 18 whereby the shaft is connected to a pipe section 20. The latter makes connection through a T-joint 21 with a pipe section 22 which opens to a cartridge 24 serving to accommodate the plastic material to be applied to the strand material. Below the cartridge is an air cylinder 26, applied to force the plastic through the system. Cartridge 24 will be seen as comprising a piston 28 interconnected to a piston 30 in cylinder 26.

The purpose of line 32 will later appear. Such line and pipe section 22 are each provided with a valve, these being numbered 34 and 36 respectively.

The output shaft of the reduction gearing 14 carries a gear 38 meshing with a gear 40 formed integral with a body member 42 rotatably supported on shaft 16. The latter (FIG. 2) has a conduit 44 extending therethrough and opening to pipe section 20. Ball bearing assemblies 46 and 48 serve an obvious purpose.

Body member 42 (FIGS. 1 and 2) includes a flange portion 50 to which is fixed a bracket 52 for a guide ring 54. This ring serves the wire or other strand material 56 which is fed from a reel 58 fixedly secured to the body member 42 to rotate therewith by means of a collar 60 threaded on the body member.

Collar 60 also secures to the body member 42 an adapter 62 which locates the bearing assembly 48 (FIG. 2). An angular flange 62a integral with the adapter 62 is functionally complementary to a flange 60a integral with the collar 60.

As will be seen from FIGURE 2, shaft 16 has threadedly connected thereto a mandrel 64, such mandrel being drilled through to provide a passageway 66 registering with the conduit or passageway 44 in shaft 16. Over the intermediate portion of its length, mandrel 64 is surrounded by a cam device 68 secured to the adapter 62 so as to rotate with body member 42. Such device is to be seen as apertured to allow for the passage therethrough of the strand material 56 which in operation of the apparatus is wound about the outer reduced end 70 of the mandrel.

A distributor plate 72, located rightward of the body of the cam device 68 as the same appears in FIGURE 2, is formed to seat a plug-like element 74 of essentially frusto-conical shape. This element with the working face 78 of the cam device delineates what may be termed an application zone 80 wherein the plastic is applied to the strand material during the winding thereof to the desired spiral configuration.

A seal plate 82, locating element 74 within the distributor plate 72, is held tightly against the distributor plate by means of a ring member 84 threaded into a second ring member 86 secured by means of bolts 88 to a support 90. Support 90 (FIG. 1) mounts a cartridge 92 in turn mounting an air cylinder 94. The entire assembly including the support 90 and the parts rightward thereof is slidable rightwardly by means of the crank (97) operated jack 95 which connects with slide bracket 99.

Cartridge 92, containing the plastic to be applied in zone 80 (FIG. 2), communicates with such zone via pipe section 96, passage 98 in the support member 90, passage 100 in the ring member 86 and the channels in the distributor plate 72. These channels are closed by the seal plate 82 and are shown in detail in FIGURE 7 wherein the numeral 102 denotes the feed inlet which communicates directly with the passage 100 in member 86. This inlet 102 opens to a hemispherical channel 104, equally dividing the flow to arcuate channels 106 delineated in part by baffles 107.

The center portion 109 of the distributor plate is to be noted as recessed in a manner complementary to the frusto-conical shape of element 74 (FIG. 2). This element, however, does not seat in the recess or concavity but is spaced (110) therefrom so as to allow for the passage of the plastic material past the ends of the baffles 107 into the application zone 80.

The arrangement of the channels and passages in the plate 72 insures equal distribution of the plastic material in the application zone 80. This makes for uniformity in the thickness of the plastic as applied to the strand material 56.

Going now to FIGURES 3 and 4 illustrating the operation of the cam device 68, it will be observed that the working face 78 thereof includes a high point 112. This high point, as the cam rotates to wind the strand material 56 about the portion 74 of the mandrel 64, operates to displace the individual coils as they are formed in the direction outward of the apparatus. This action proceeds, as should now be clear, simultaneously with the coating of the strand material.

In the case of the embodiment illustrated by FIGURES 1–4, additional plastic is applied to the coiled strand material via the passage 66 in the mandrel 64. Such passage, as previously described, connects with the cartridge 24 via passage 44 in shaft 16 and pipe sections 20 and 22. The plastic emitting from the end of the mandrel fills the hollow core of the coiled and coated strand material to give a product of the construction clearly shown by FIGURES 3 and 4. The boss portion 124 (FIG. 2) of element 74 thus delineates a second application zone 125.

It should be observed that the aperture in the cam device 68 through which the strand material 56 passes (FIGS. 3 and 4) is drilled to open at the ledge 114 resulting from the high point 112. In operation of the system, the rotating parts including the cam device 68 revolve in the clockwise direction.

It is an important feature of the invention that the motive power causing the required movement of the strand material through the apparatus is supplied by the pressure of the plastic material.

Going now to the modifications to which FIGURES 5 and 6 are directed, the formed figure shows the use of a pair of wires 56a rather than one wire as in the preceding figures. These wire pass through corresponding apertures in the cam device 68A, both apertures opening at the ledge 114a resulting from the high point 112a. In the manner illustrated, an insulated cable is provided comprising two leads insulated from each other. The separation of the individual coils as they leave the reduced end 70a of the mandrel 64a is a function of the plastic supplied through the mandrel. This is true also, of course, as to FIGURES 1–4.

In FIGURE 6, where the cam device and strand material or wire are respectively denoted by the numerals 68b and 56b, the working portion 70b of the mandrel 64b is shown as tapered and fluted at 120. This design contemplates the introduction through the mandrel 64b of air or other suitable gas under pressure into the core of the spirally wound and coated material in order to achieve a hollow cable, desirable for some applications. The gas is supplied to the mandrel via pipe 32, seen in FIGURE 1.

The purpose of the fluting and tapering of the mandrel at 120 is to insure complete coating of the innersurfaces of the wire coil. In effect the flutes or grooves constitute channels for the flow of plastic to such surfaces.

It is believed that the operation of the apparatus should now be quite clear. Further reference, however, should be made to FIGURE 1 where certain parts have not yet been identified. It is contemplated that the plastic material is not self-curing, accordingly there is shown a conveyor 130 for transporting the product of the apparatus without tensioning thereof through an oven 132 maintained at a temperature required to effect the cure. The cured product is drawn from the oven by means of a suitably powered reel 134.

As before indicated, the invention is considered particularly important as applied in the manufacture of insulated electric wiring, although products of a non-electrical nature may also be fabricated according to the invention.

As to electric wiring and other electrical products, the employment of silicone rubber as the insulating material is preferred for the reasons previously given. The silicone rubber is preferably so compounded that it possesses near maximum elasticity to the end that the product will be stretchable to an extent approaching the limits set by the extensibility of the coiled conductor.

It should be clearly understood that the preceding disclosure is illustrative only and that no limitation is intended to the particular embodiments described. All modifications and arrangements which do not constitute departures from the spirit of the invention are to be taken as embraced thereby.

The invention claimed is:

1. Apparatus for fabricating insulated electric cable, said apparatus comprising means delineating a coating zone, means for continuously introducing a plastic insulating material into said zone, reel means from which the conductor component of the cable is continuously fed into said zone to effect continuous coating thereof with said material, mandrel means within said zone and terminating therebeyond, rotating means within said zone operating to wind said conductor about said mandrel to coil the same, said last means being formed in the manner of a cam so as to displace the individual coils on said mandrel as they are formed in a direction outward of said zone, and conveyor means for continuously removing the coiled and coated conductor from the apparatus.

2. Apparatus according to claim 1 when said mandrel has a conduit therethrough and when the apparatus comprises means whereby insulating material may be forced through said conduit into the core of the coiled and coated conductor.

3. Apparatus according to claim 1 in which said mandrel is tapered and fluted in the area thereof initially receiving the conductor, the tapering extending in the direction toward said conveyor means, the fluting operating to insure deposition of insulating material on the inner surfaces of the coils.

4. Apparatus for applying a plastic substance to a strand material while forming the same to a helical configuration, said apparatus comprising a fixed elongated member having a conduit extending therethrough, an elongated mandrel fixedly supported by said elongated member at one end thereof and having a conduit extending therethrough registering with said first mentioned conduit, rotatably driven means journaled on said member, said rotatably driven means including a reel for the accommodation of the strand material and cam means surrounding said mandrel and apertured to allow for passage of said strand material therethrough for wrapping about a portion of said mandrel, means providing an application zone about such portion of said mandrel, said cam means being located in said zone and being formed to include a high point whereby each individual helix as formed is axially displaced, means for introducing the plastic substance under pressure into said zone, and conveyor means for moving the strand material from the apparatus following application of said substance thereto.

(References on following page)

References Cited

UNITED STATES PATENTS

| | | | |
|---|---|---|---|
| 2,513,106 | 6/1950 | Prendergast | 264—173 X |
| 2,887,721 | 5/1959 | Blanchi et al. | 156—169 X |
| 2,810,424 | 10/1957 | Swartswelter et al. | 264—174 X |
| 3,121,255 | 2/1964 | Henning et al. | |
| 3,277,225 | 10/1966 | Heard | 264—174 |
| 3,370,999 | 2/1968 | Schwartzrock | 264—95 X |

FOREIGN PATENTS 1,186,202  1/1965  Germany.

ROBERT F. WHITE, Primary Examiner

T. J. CARVIS, Assistant Examiner

U.S. Cl. X.R.

264—173, 174